United States Patent
Takehara et al.

(10) Patent No.: US 10,220,716 B2
(45) Date of Patent: Mar. 5, 2019

(54) ELECTRIC BUS AND CHARGING SYSTEM

(71) Applicants: Kabushiki Kaisha Toshiba, Minato-ku (JP); Toshiba Infrastructure Systems & Solutions Corporation, Kawasaki-shi (JP)

(72) Inventors: Jun Takehara, Setagaya (JP); Fumiyasu Miyoshi, Wako (JP)

(73) Assignees: Kabushiki Kaisha Toshiba, Minato-ku (JP); Toshiba Infrastructure Systems & Solutions Corporation, Kawasaki-shi (JP)

(*) Notice: Subject to any disclaimer, the term of this patent is extended or adjusted under 35 U.S.C. 154(b) by 0 days.

(21) Appl. No.: 15/560,363

(22) PCT Filed: Sep. 1, 2015

(86) PCT No.: PCT/JP2015/074888
§ 371 (c)(1),
(2) Date: Sep. 21, 2017

(87) PCT Pub. No.: WO2016/151887
PCT Pub. Date: Sep. 29, 2016

(65) Prior Publication Data
US 2018/0072172 A1    Mar. 15, 2018

(30) Foreign Application Priority Data

Mar. 23, 2015   (JP) .................................. 2015-060101

(51) Int. Cl.
*B60L 11/18*    (2006.01)
*H02J 7/00*    (2006.01)
*H02J 7/02*    (2016.01)

(52) U.S. Cl.
CPC ........... *B60L 11/1825* (2013.01); *B60L 11/18* (2013.01); *B60L 11/1816* (2013.01); *H02J 7/00* (2013.01);
(Continued)

(58) Field of Classification Search
CPC .................................................. B60L 11/1825
(Continued)

(56) References Cited

U.S. PATENT DOCUMENTS

2008/0277173 A1    11/2008   Midrouillet et al.
2009/0085522 A1    4/2009    Matsumoto

FOREIGN PATENT DOCUMENTS

JP    2008-199723 A    8/2008
JP    2010-183771 A    8/2010
(Continued)

OTHER PUBLICATIONS

International Search Report and Written Opinion dated Nov. 17, 2015 in PCT/JP2015/074888 (with English language translation).

*Primary Examiner* — Edward Tso
*Assistant Examiner* — Ahmed Omar
(74) *Attorney, Agent, or Firm* — Oblon, McClelland, Maier & Neustadt, L.L.P.

(57) ABSTRACT

According to embodiments, an electric bus includes an electricity storage function unit, a power receiving unit, a charger, a driving unit, doors, and a controller. The controller transmits a first signal including information capable of identifying an attribute of the electric bus and instructing an external device to start charging the electricity storage function unit, to the external device, upon detecting at least one of the doors is opened; and transmits a second signal instructing the external device to stop charging the electricity storage function unit, to the external device, upon detecting all the doors are closed.

12 Claims, 4 Drawing Sheets

(52) U.S. Cl.
CPC ............... *H02J 7/007* (2013.01); *H02J 7/02* (2013.01); *B60L 2200/18* (2013.01); *B60L 2240/28* (2013.01); *Y02T 10/7005* (2013.01)

(58) Field of Classification Search
USPC .................................................. 320/104, 109
See application file for complete search history.

(56) References Cited

FOREIGN PATENT DOCUMENTS

| | | |
|---|---|---|
| JP | 2013-27159 A | 2/2013 |
| JP | 2013-243922 A | 12/2013 |
| WO | WO 2014/078456 | 5/2014 |

| DOOR 2 | DOOR 3 | CHARGING CONTROL |
|---|---|---|
| EITHER OR BOTH OPENED || START CHARGING |
| BOTH CLOSED || STOP CHARGING |

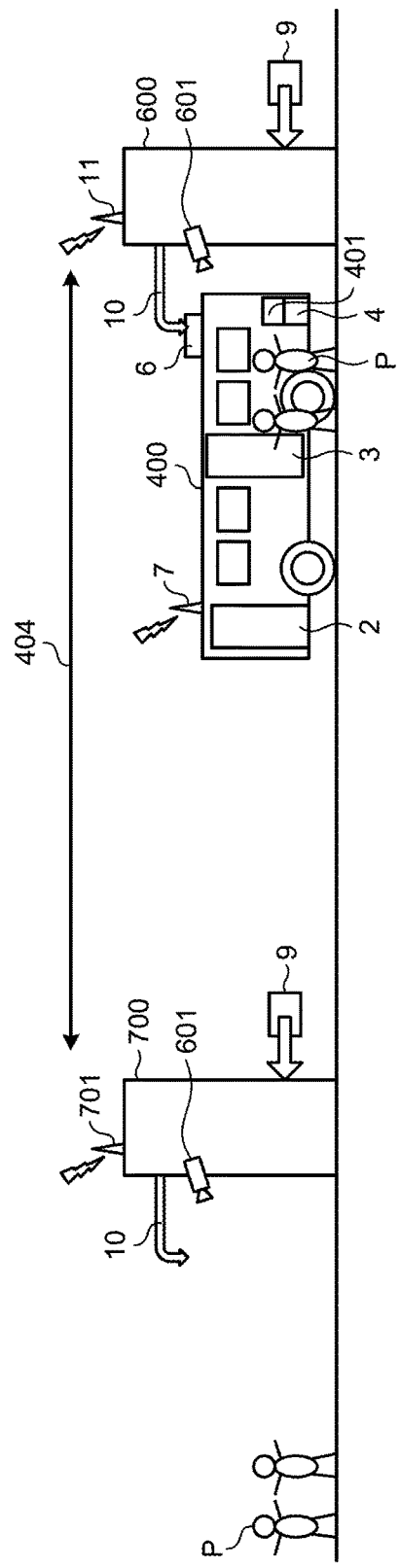

ELECTRIC BUS AND CHARGING SYSTEM

CROSS-REFERENCE TO RELATED APPLICATIONS

This application is national stage application of International Application No. PCT/JP2015/074888, filed Sep. 1, 2015, which designates the United States, incorporated herein by reference, and which claims the benefit of priority from Japanese Application No. 2015-060101, filed on Mar. 23, 2015, the entire contents of which are incorporated herein by reference.

FIELD

Embodiments of described herein relate generally to an electric bus and a charging system.

BACKGROUND

Electric vehicles (EV) driven by electric energy have been developed to prevent global warming and to prepare for the depletion of petroleum resources. The electric vehicles have also been introduced to public transportation. The electric vehicles are powered by electric energy, and an electricity storage function unit such as a storage battery provided in each of the electric vehicles is charged with electric energy. For example, when the electric vehicle is employed for a route bus, there is a method of charging the route bus once a day with electric energy allowing the route bus to run throughout the day, or a method of charging the route bus with electric energy when the route bus stops at a bus terminal or a bus stop, while the route bus is in operation.

In the method of charging the route bus only once a day with electric energy allowing the route bus to run throughout the day, the route bus needs to be installed with an electricity storage function unit capable of storing electric energy allowing the route bus to run throughout the day. Consequently, the size, the weight, and the cost of the electricity storage function unit will be increased. Hence, the method of charging the route bus with electric energy when the route bus stops at the bus terminal or the bus stop while the route bus is in operation can reduce the size, the weight, and the cost of the electricity storage function unit that is to be installed on the route bus, compared with the method of charging the route bus only once a day can. Moreover, travel distance of the route bus per unit amount of electric power is also increased.

To charge an electricity storage function unit of a route bus with electric energy, the crew of the route bus connects a cable of an external charger to a charging port of the route bus, and charges the electricity storage function unit of the route bus. With this method, when the route bus has stopped at the bus stop, the crew needs to step out of the route bus for a while, and perform an operation of connecting the cable of the external charger to the charging port and the like. Thus, charging cannot be completed in a short time. Consequently, a system of charging the electricity storage function unit using a pantograph and an overhead line while the crew is on board the route bus, such as a trolley bus, has been known.

However, even in this system, the crew of the route bus needs to perform an input operation of information to start or stop charging the electricity storage function unit, after the route bus has stopped. This may interfere with other services such as checking the safety of the bus stop, collecting bus fare from the passengers getting on or off the route bus, and the like. Thus, to complete charging in a short time and operate the bus on schedule, it has been demanded to save time and effort required for charging as much as possible.

BRIEF DESCRIPTION OF DRAWINGS

FIG. 7 is a diagram illustrating an example of a schematic configuration of a charging system according to a sixth embodiment.

DETAILED DESCRIPTION

According to embodiments, an electric bus includes an electricity storage function unit, a power receiving unit, a charger, a driving unit, doors, and a controller. The Power receiving unit receives electric power supplied from an external device by coming into contact with a power feeding unit of the external device. The charger charges the electricity storage function unit with the electric Power received from the power receiving unit. The driving unit drives the electric bus by receiving supply of the electric power from the electricity storage function unit. The doors are installed at entrance and exit portions. The controller transmits a first signal including information capable of identifying an attribute of the electric bus and instructing the external device to start charging the electricity storage function unit, to the external device, upon detecting at least one of the doors is opened; and transmits a second signal instructing the external device to stop charging the electricity storage function unit, to the external device, upon detecting all the doors are closed.

Hereinafter, an electric bus and a charging system according to the present embodiment will be described with reference to the accompanying drawings.

First Embodiment

Figure 1:
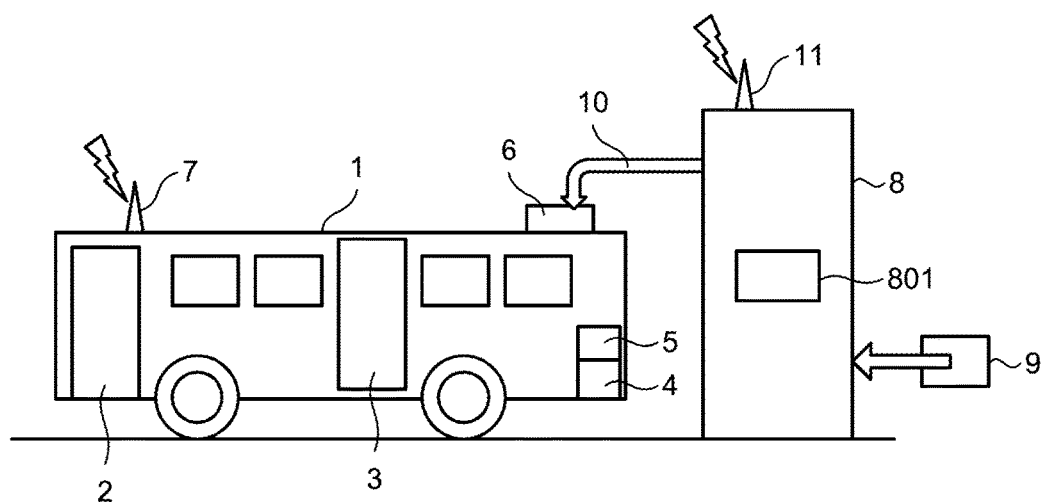
FIG. 1 is a diagram illustrating an example of a schematic configuration of a charging system according to a first embodiment.

FIG. 1 is a diagram illustrating an example of a schematic configuration of a charging system according to a first embodiment. As illustrated in FIG. 1, a charging system of the present embodiment includes a route bus 1 (an example of an electric bus) and a charging device 8 (an example of an external device). The route bus 1 is powered by electric energy and passengers get on and get off the route bus 1 at a bus stop (an example of a first position) on a route. The charging device 8 is provided at the bus stop of the route bus 1, and supplies and charges the route bus 1 that has stopped at the bus stop with electric power.

The route bus 1 includes at least one of doors 2 and 3 installed at entrance and exit portions. Passengers get on and get off the route bus 1 through the doors 2 and 3, when the route bus 1 stops at the bus stop. In the present embodiment, the doors 2 and 3 are what are called automatic doors that open and close according to an operation of a door open/close operation unit 101 (see FIG. 2) performed by the crew of the route bus 1. In the present embodiment, the route bus 1 has two of the doors 2 and 3. However, it is not limited thereto, and for example, the route bus 1 may have three or more doors when the route bus 1 is an articulated bus.

The route bus 1 includes a storage battery 4, a charge/discharge function unit 5, a charging port 6, and a route bus communication unit 7. The storage battery 4 is an example of an electricity storage function unit that is charged by electric power received from the charging device 8 and that discharges electric power when the route bus 1 is driven. In the present embodiment, the storage battery 4 is used as an example of the electricity storage function unit. However, it is not limited thereto, and for example, the electricity storage function unit may also be a capacitor and the like.

The charging port 6 is a charging plate and the like, and is an example of a power receiving unit that receives electric power supplied from the charging device 8 by coming into contact with a charging mechanism 10 of the charging device 8. In the present embodiment, the charging port 6 is provided on the roof of the route bus 1, and receives electric power supplied from the charging device 8 via the charging mechanism 10, by coming into contact with the charging mechanism 10 that has moved to the upper side of the route bus 1.

The charge/discharge function unit 5 charges the storage battery 4 with electric power received through the charging port 6. The charge/discharge function unit 5 supplies the electric power discharged from the storage battery 4 to a driving unit, which is not illustrated, for driving the route bus 1, via a power feeding line 112 (see FIG. 2). In this example, the driving unit is a safety mechanism and electric equipment provided on a vehicle that is operated by a power converter, a motor, a diesel engine, and the like; fare collection equipment for collecting bus fare from passengers; a display for displaying various types of information for the passengers; and the like.

The route bus communication unit 7 is a communication unit for communicating with the charging device 8 and the like. In the present embodiment, the route bus communication unit 7 wirelessly communicates with the charging device 8 and the like, by transmitting radio waves via an antenna, which is not illustrated.

The charging device 8 is provided at the bus stop where the route bus 1 stops and the like. The charging device 8 has a function of receiving electric power from an external power generation device 9 such as a commercial power system, a power generator, and a solar power generator, and converting the supplied electric power to electric power used for charging the route bus 1. The charging device 8 includes the charging mechanism 10 (an example of a supplying unit) that supplies electric power to the route bus 1 via the charging port 6, by coming into contact with the charging port 6 of the route bus 1. The charging mechanism 10 is an electric supply pole and the like, and supplies electric power to the route bus 1 by moving to the upper side of the route bus 1 and coming into contact with the charging port 6 of the route bus 1, when the route bus 1 stops at the bus stop. Moreover, the charging device 8 includes a charging device side communication unit 11 that is a communication unit for communicating with the route bus 1 and the like. In the present embodiment, the charging device side communication unit 11 wirelessly communicates with the route bus 1 and the like, by transmitting radio waves via an antenna, which is not illustrated.

Figure 2:
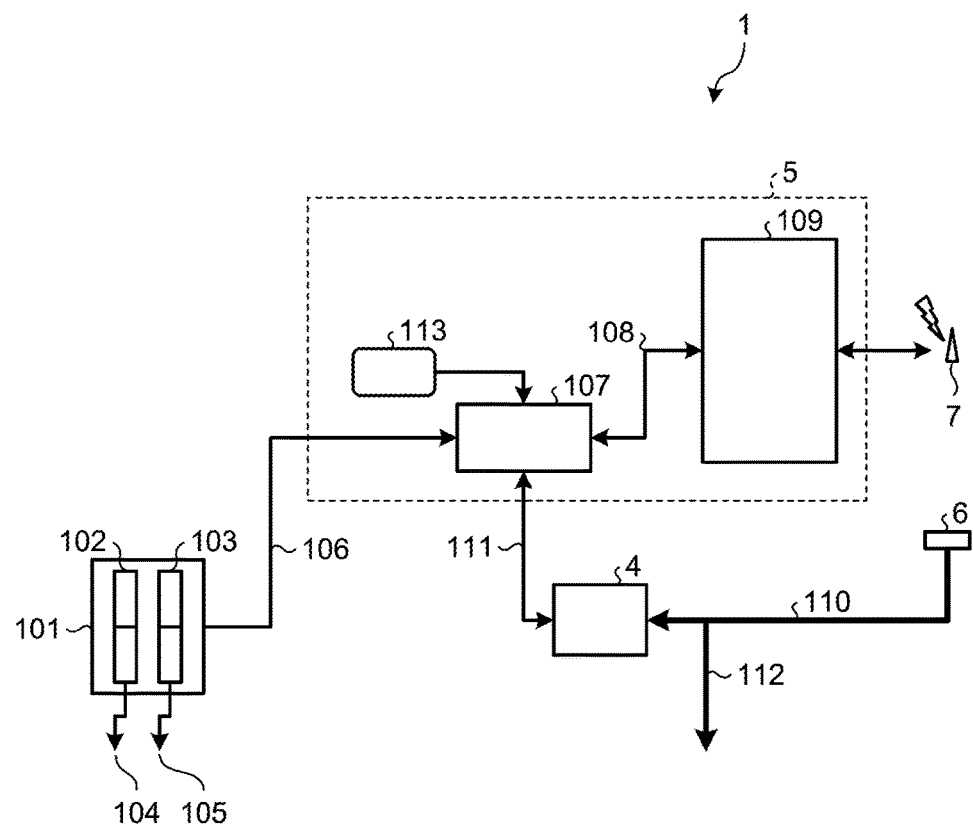
FIG. 2 is a diagram illustrating an example of a functional configuration of a route bus in the charging system according to the first embodiment.

FIG. 2 is a diagram illustrating an example of a functional configuration of a route bus in the charging system according to the first embodiment. As illustrated in FIG. 2, the route bus 1 of the present embodiment includes the door open/close operation unit 101 used by the crew to open and close the doors 2 and 3. The door open/close operation unit 101 includes a first operation lever 102 for opening and closing the door 2, and a second operation lever 103 for opening and closing the door 3. The door open/close operation unit 101 opens and closes the door 2 by outputting a first open/close control signal 104 for instructing the door 2 to open or the door 2 to close, to the door 2, according to an operation on the first operation lever 102. The door open/close operation unit 101 also opens and closes the door 3, by outputting a second open/close control signal 105 for instructing the door 3 to open or the door 3 to close, to the door 3, according to an operation on the second operation lever 103.

When the first open/close control signal 104 for instructing the door 2 to open, or the second open/close control signal 105 for instructing the door 3 to open is output, the door open/close operation unit 101 transmits a charging instruction signal 106 for instructing the charge/discharge function unit 5 to start charging the storage battery 4, to the charge/discharge function unit 5. On the other hand, when the first open/close control signal 104 for instructing the door 2 to close and the second open/close control signal 105 for instructing the door 3 to close are output, the door open/close operation unit 101 transmits the charging instruction signal 106 for instructing the charge/discharge function unit 5 to stop charging the storage battery 4, to the charge/discharge function unit 5. In this manner, the door open/close operation unit 101 controls to start and stop charging the storage battery 4 by the charge/discharge function unit 5.

The charge/discharge function unit 5 includes a charge controller 107, a communication controller 109, and a charge control button 113. The charge control button 113 is an example of a first button for instructing the charge/discharge function unit 5 to start or stop charging the storage battery 4.

The charge controller 107 is an example of a charger that charges the storage battery 4 with electric power received through the charging port 6. In the present embodiment, the charge controller 107 charges the storage battery 4, by supplying electric power received through the charging port 6 to the storage battery 4, via a power charging line 110 connected to the charging port 6. Moreover, upon detecting that at least one of the doors 2 and 3 is opened (in this embodiment, when the charging instruction signal 106 for instructing the charge/discharge function unit 5 to start charging the storage battery 4 is input), the charge controller 107 (an example of a controller) transmits a charger control signal 108 (an example of a first signal) that includes information capable of identifying the route bus 1 (hereinafter, referred to as attribute information) and that instruct the charging device 8 to start charging the storage battery 4, to the charging device 8 via the communication controller 109. In this example, the attribute information is information capable of identifying the route bus such as the type and characteristics of the route bus 1. More specifically, the attribute information may be electrical parameters such as storage capacity and charging voltage of the storage battery 4 mounted on the route bus 1, and electric current that can be supplied from the storage battery 4. The attribute information may also be identification code and type name of the route bus 1 set in advance. The attribute information may further be a combination of the electrical parameters, the identification code, and the type name.

Upon detecting that both of the doors 2 and 3 are closed (in the present embodiment, when the charging instruction signal 106 for instructing the charge/discharge function unit 5 to stop charging is supplied), the charge controller 107 transmits the charger control signal 108 for instructing the charging device 8 to stop charging the storage battery 4 (an example of a second signal), to the charging device 8 via the communication controller 109. Moreover, the charge controller 107 detects the battery voltage of the storage battery 4, via a battery information monitoring line 111. When the detected battery voltage has reached a predetermined voltage, the charge controller 107 transmits the charger control signal 108 for instructing the charging device 8 to stop charging the storage battery 4, to the charging device 8 via the communication controller 109. The communication controller 109 wirelessly transmits the charger control signal 108 supplied from the charge controller 107, to the charging device 8 via the route bus communication unit 7.

In the present embodiment, the charge controller 107 (an example of a switching unit) switches modes between an automatic mode (an example of a first mode) as a mode to start or stop charging the storage battery 4 according to the detection result of whether the doors 2 and 3 are opened or closed, and a manual mode (an example of a second mode) as a mode to start or stop charging the storage battery 4 according to an operation on the charge control button 113. When the mode is switched to the automatic mode, the charge controller 107 transmits the charger control signal 108 to the charging device 8, according to the detection result of whether the doors 2 and 3 are opened or closed. On the other hand, when the mode is switched to the manual mode, the charge controller 107 transmits the charger control signal 108 to the charging device 8, according to an operation on the charge control button 113.

More specifically, when the charge controller 107 is switched to the manual mode and instructed to start charging the storage battery 4 by the charge control button 113 being operated, the charge controller 107 transmits the charger control signal 108 for instructing the charging device 8 to start charging the storage battery 4, to the charging device 8. On the other hand, when the charge controller 107 is switched to the manual mode and instructed to stop charging the storage battery 4 by the charge control button 113 being operated, the charge controller 107 transmits the charger control signal 108 for instructing the charging device 8 to stop charging the storage battery 4, to the charging device 8.

Returning to FIG. 1, the charging device side communication unit 11 of the charging device 8 receives the charger control signal 108 from the route bus 1. When the charger control signal 108 received from the charging device side communication unit 11 instructs the charging device 8 to start charging the storage battery 4, a charger side controller 801 of the charging device 8 controls the charging mechanism 10, and moves the charging mechanism 10 to the upper side of the route bus 1. The charger side controller 801 then supplies electric power to the route bus 1, after bringing the charging mechanism 10 into contact with the charging port 6. On the other hand, when the charger control signal 108 received from the charging device side communication unit 11 instructs the charging device 8 to stop charging the storage battery 4, the charger side controller 801 controls the charging mechanism 10 and moves the charging mechanism 10 away from the upper side of the route bus 1. The charger side controller 801 then cancels the contact between the charging mechanism 10 and the route bus 1, and stops supplying electric power to the route bus 1. When the supply of electric power to the route bus 1 is stopped (in other words, when charging of the storage battery 4 is finished), the charger side controller 801 shifts to a waiting mode. In this example, the waiting mode is an energy saving mode by reducing electric power consumption in the charging device 8. In the present embodiment, the charger side controller 801 shifts the charging device 8 to the waiting mode, by opening the electromagnetic switch and canceling the connection between the commercial power system and the charging device 8, or by stopping an inverter in the charging device 8.

Figures 3, 4:
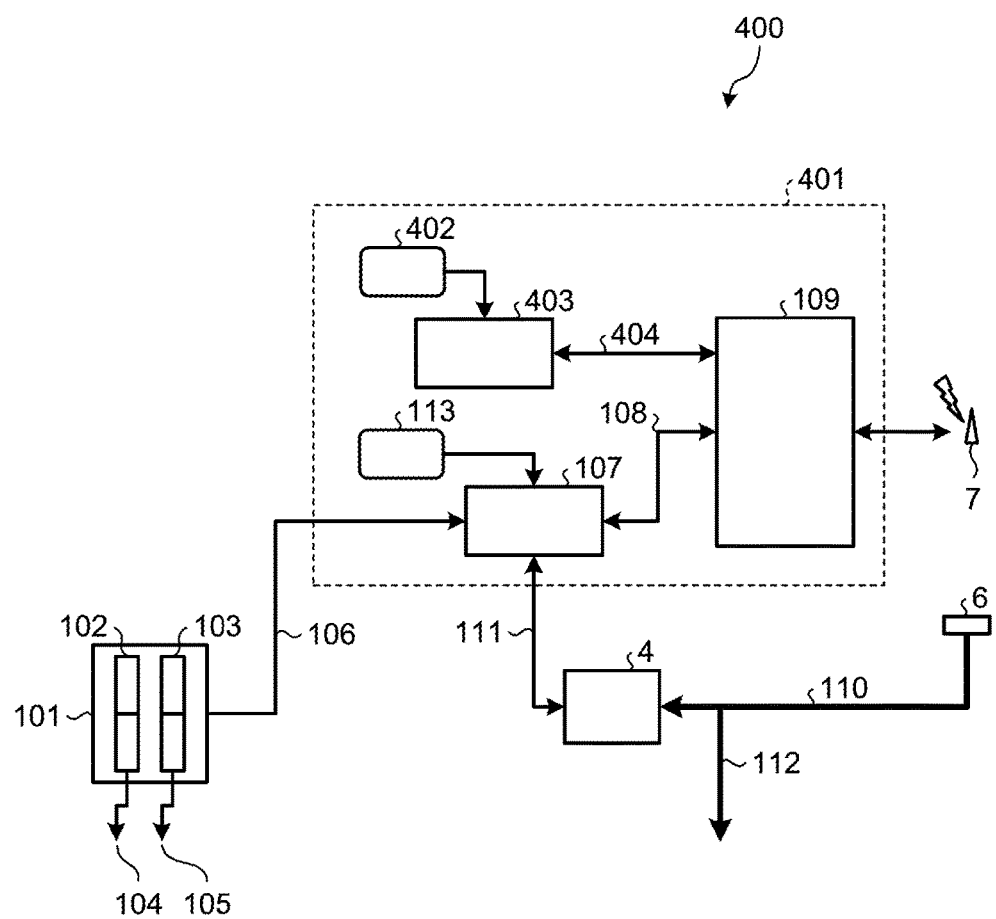
FIG. 3 is an explanatory diagram of an example of a charging process in the charging system according to the first embodiment.
FIG. 4 is a diagram illustrating an example of a functional configuration of a route bus in a charging system according to a second embodiment.

FIG. 3 is an explanatory diagram of an example of a charging process in the charging system according to the first embodiment. In the present embodiment, upon detecting that one of the doors 2 and 3, or both of the doors 2 and 3 are opened, the charge controller 107 transmits the charger control signal 108 for instructing the charging device 8 to start charging the storage battery 4, to the charging device 8 via the communication controller 109. On the other hand, upon detecting that both of the doors 2 and 3 are closed, the charge controller 107 transmits the charger control signal 108 for instructing the charging device 8 to stop charging the storage battery 4, to the charging device 8 via the communication controller 109.

In this manner, with the charging system according to the first embodiment, it is possible to start or stop charging the storage battery 4 in conjunction with opening and closing of the doors 2 and 3 of the route bus 1. Consequently, the crew does not need to perform an operation of start or stop charging the storage battery 4 at the bus stop, thereby reducing the operation burden on the crew. Moreover, it is possible to prevent an operation error by the crew when the crew starts or stops charging the storage battery 4, or prevent the crew from forgetting to charge the storage battery 4.

In the present embodiment, the charge controller 107 does not transmit the charger control signal 108 for instructing the charging device 8 to stop charging the storage battery 4 to the charging device 8, until it is detected that both of the doors 2 and 3 are closed. However, to prevent the route bus 1 from starting moving while the storage battery 4 is being charged and the doors 2 and 3 are opened, the charge controller 107 may transmit the charger control signal 108 for instructing the charging device 8 to stop charging the storage battery 4 to the charging device 8, when the parking brake, the shift lever, or the ignition key is operated, regardless of the detection result of whether the doors 2 and 3 are opened or closed. In this manner, it is possible to prevent the route bus 1 from starting moving while the storage battery 4 is being charged.

Second Embodiment

The present embodiment is an example of transmitting reservation information for instructing the charging device to execute an advance preparation process, to the charging device, when information on instructing the charging device to execute the advance preparation process (an example of a preparation process) that is a process required for charging the storage battery is input. In the following explanation, the descriptions of the same components as those of the first embodiment will be omitted.

FIG. 4 is a diagram illustrating an example of a functional configuration of a route bus in a charging system according to a second embodiment. As illustrated in FIG. 4, in the present embodiment, a charge/discharge function unit 401 of a route bus 400 includes a charge reservation operation button 402 and a charge reservation unit 403, in addition to the charge controller 107, the communication controller 109, and the charge control button 113. The charge reservation operation button 402 is a button for instructing the charging device 8 to execute the advance preparation process that is a process required for charging the storage battery 4. When the execution of the advance preparation process is instructed through the charge reservation operation button 402, the charge reservation unit 403 (an example of a controller) transmits reservation information 404 (an example of a third signal) for instructing the charging device 8 to execute the advance preparation process, to the charging device 8 via the communication controller 109. In the present embodiment, the reservation information 404 includes information indicating the attributes of the route bus 400 such as the type and characteristics of the route bus 400.

When the crew presses a cancel button, which is not illustrated, in the route bus 400, and the cancellation of the advance preparation process is instructed, the charge reservation unit 403 transmits cancel information that includes the attribute information and that instructs the charging device 8 to cancel the advance preparation process, to the charging device 8 via the communication controller 109. In this manner, when the route bus 400 passes through a bus stop without stopping at the bus stop, even if the execution of the advance preparation process is instructed, the state that the charging device 8 has executed the advance preparation process is maintained, thereby preventing the consumption power of the charging device 8 from increasing.

In the present embodiment, the charging device side communication unit 11 of the charging device 8 receives the reservation information 404 from the route bus 400. When the charging device side communication unit 11 receives the reservation information 404, the charger side controller 801 executes the advance preparation process according to the received reservation information 404. By executing the advance preparation process prior to the arrival of the route bus 400 to the bus stop, it is possible to start charging the storage battery 4 as soon as the route bus 400 arrives at the bus stop. Consequently, it is possible to reduce the time required to start charging the storage battery 4.

In this example, the advance preparation process is a process of moving the charging mechanism 10 to the upper side of the route bus 400 in advance, a process of detecting the connection with the commercial power system by the electromagnetic switch, a process of activating the inverter in the charging device 8, and a process of determining the normality of a charger, which is not illustrated, for example. The advance preparation process also includes a process of charging a capacitor, a battery, or the like that discharges large electric power so as to charge the storage battery 4 quickly, and a process of adjusting the voltage to be applied to the storage battery 4, when various types of the route buses 400 are to be charged.

The charging device side communication unit 11 receives cancel information from the route bus 400. When the charging device side communication unit 11 receives the cancel information, the charger side controller 801 cancels the execution of the advance preparation process instructed by the route bus 400 that is indicated in the attribute information included in the received cancel information. When the charging device side communication unit 11 receives the reservation information 404, but the charger control signal 108 for instructing the charging device 8 to start charging the storage battery 4 is not received and the storage battery 4 is not charged, even after a predetermined period of time has passed, the charger side controller 801 cancels the execution of the advance preparation process and shifts to a waiting mode. When a predetermined period of time has passed without receiving any reservation information 404, the charger side controller 801 may also shift to the waiting mode.

In this manner, with the charging system according to the second embodiment, it is possible to start charging the storage battery 4 as soon as the route bus 400 arrives at the bus stop. Consequently, it is possible to reduce the time required to start charging the storage battery 4.

Third Embodiment

The present embodiment is an example of transmitting reservation information to the charging device, when a bus stopping button is pressed. In the following explanation, the descriptions of the same components as those of the second embodiment will be omitted.

Figure 5:
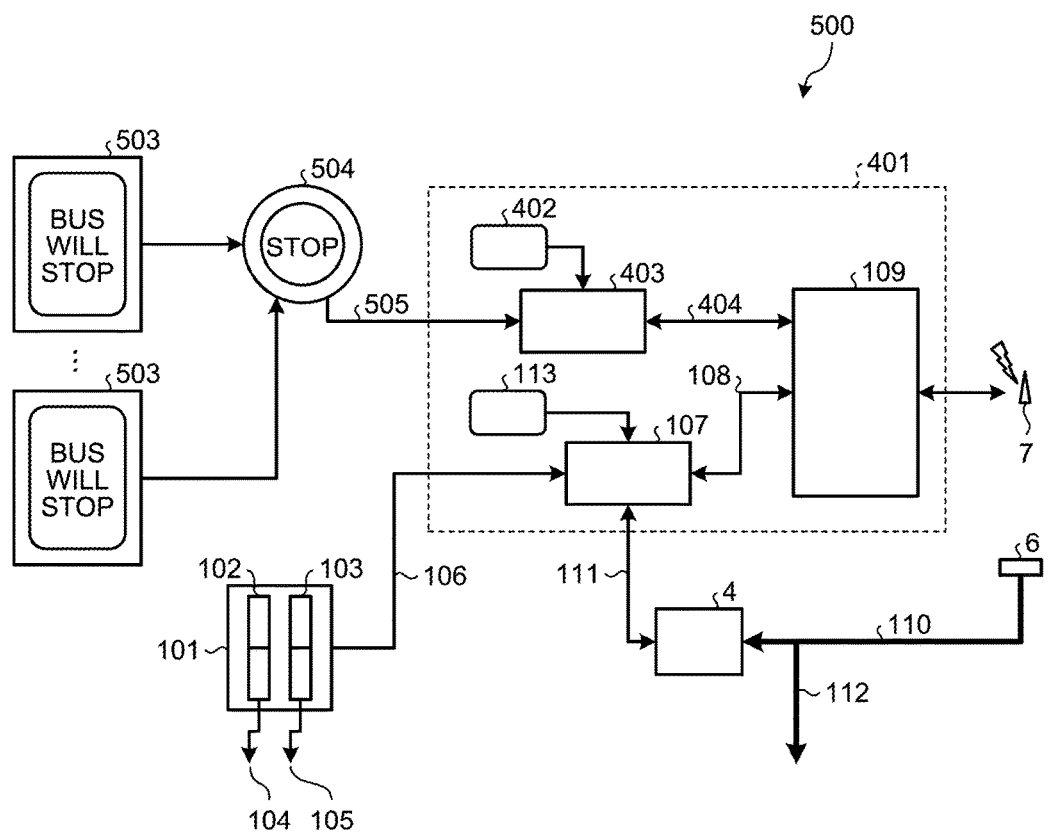
FIG. 5 is a diagram illustrating an example of a functional configuration of a route bus in a charging system according to a third embodiment.

FIG. 5 is a diagram illustrating an example of a functional configuration of a route bus in a charging system according to a third embodiment. As illustrated in FIG. 5, in the present embodiment, a route bus 500 includes a bus stopping button 503 and a bus stopping display 504, in addition to the functional configuration of the route bus 400 according to the second embodiment. The passenger of the route bus 500 can press the bus stopping button 503, and the bus stopping button 503 is a button for instructing the route bus 500 to stop. Moreover, when the passenger presses the bus stopping button 503, a stop instruction signal 505 for instructing the route bus 500 to stop is output to the charge reservation unit 403.

In the present embodiment, the charge reservation unit 403 transmits the reservation information 404 to the charging device 8 via the communication controller 109, when the bus stopping button 503 is pressed (in other words, when the stop instruction signal 505 is input from the bus stopping button 503). Moreover, when the bus stopping button 503 is pressed, the charge reservation unit 403 displays a message indicating that the bus stopping button 503 is pressed, on a bus stopping display 504 (an example of a display).

In this manner, with the charging system according to the third embodiment, the advance preparation process is executed when the passenger who is planning to get off at the next bus stop presses a bus stopping button 503. Consequently, when a passenger is getting off at the next bus stop, the reservation information is transmitted to the charging device 8 and the advance preparation process is executed, even if the crew of the route bus 500 does not press the charge reservation operation button 402. As a result, it is possible to reduce the operation burden on the crew. Moreover, it is possible to prevent an operation error of the charge reservation operation button 402 by the crew, and prevent the crew from forgetting to operate the charge reservation operation button 402. Furthermore, if none of the passengers is getting off at the bus stop, and the route bus 500 is going to pass through the bus stop, it is possible to prevent the advance preparation process from being unnecessarily executed.

If the route bus 500 includes an output device such as a speaker for verbally announcing the bus stop, and when the route bus 500 approaches the bus stop without the bus stopping button 503 being pressed, after the crew has pressed an activation button and a verbal announcement is output from the output device, the charge reservation unit 403 does not transmit cancel information because the reservation information 404 is not transmitted. On the other hand, when the route bus 500 does not stop at the bus stop and a reset button for erasing the message displayed on the bus stopping display 504 is pressed, after the bus stopping button 503 is pressed and the reservation information 404 is transmitted to the charging device 8, the charge reservation unit 403 hides the message on the bus stopping display 504, and transmits cancel information to the charging device 8.

In this manner, it is possible to cancel the advance preparation process even if the crew does not press the cancel button, which is not illustrated, when the route bus 500 does not stop at the bus stop after the reservation information 404 is transmitted. It is to be noted that when the route bus 500 does not stop at the bus stop after the reservation information 404 is transmitted, switching may be possible between the transmitting of the cancel information to the charging device 8 in response to the cancel button, which is not illustrated, being pressed and the transmitting of the cancel information to the charging device 8 in conjunction with the process of hiding the message displayed on the bus stopping display 504.

Fourth Embodiment

The present embodiment is an example of executing an advance preparation process, when a passenger waiting for the arrival of the route bus is detected at the bus stop. In the following explanation, the descriptions of the same portions as those of the second embodiment are omitted.

Figure 6:
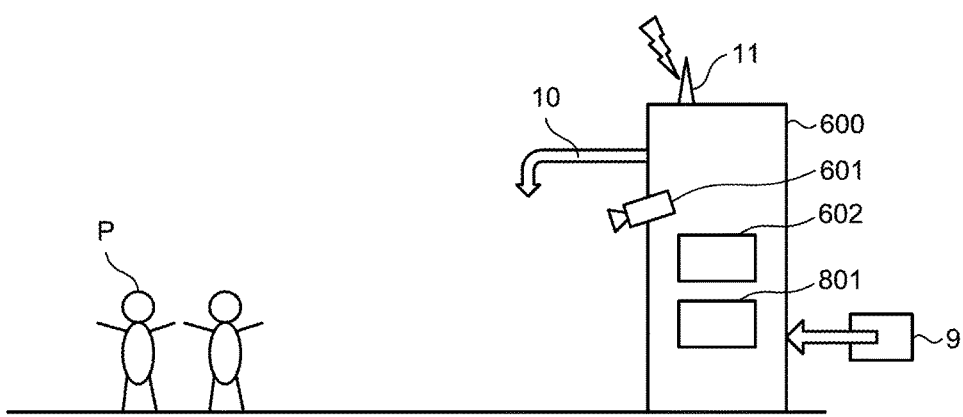
FIG. 6 is a diagram illustrating an example of a charging device in a charging system according to a fourth embodiment.

FIG. 6 is a diagram illustrating an example of a charging device in a charging system according to a fourth embodiment. As illustrated in FIG. 6, in the present embodiment, a charging device 600 includes a camera 601 and a detector 602 in addition to the configuration of the charging device 8 according to the second embodiment. The camera 601 is configured of an infrared camera and the like, and is an example of an imaging unit that can take an image of a passenger P who is waiting for the route bus 400 at the bus stop provided with the charging device 600. The detector 602 detects the passenger P who is waiting for the route bus 400 at the bus stop, using the image taken by the camera 601. Moreover, upon detecting the passenger P waiting for the route bus 400 at the bus stop, the detector 602 detects the number of passengers P who are waiting for the route bus 400 at the bus stop, using the image taken by the camera 601.

In the present embodiment, when the detector 602 detects the passenger P waiting for the route bus 400 at the bus stop, the charger side controller 801 executes the advance preparation process. The charger side controller 801 may also transmit the detection result of the passenger by the detector 602 to the route bus 400 via the charging device side communication unit 11, and cause a display, which is not illustrated, of the route bus 400 to display the detection result. In this manner, it is possible to let the crew of the route bus 400 to identify the presence of the passenger P waiting at the bus stop.

When the number of passengers detected by the detector 602 is equal to or less than a predetermined number, the charger side controller 801 does not execute the advance preparation process. On the other hand, when the number of passengers detected by the detector 602 exceeds the predetermined number, the charger side controller 801 executes the advance preparation process. In this manner, the advance preparation process is only executed when the number of passengers P waiting for the route bus 400 at the bus stop is large, and when the time the route bus 400 stops at the bus stop is long. Consequently, it is possible to execute the advance preparation process depending on the number of passengers getting on the route bus 400 and the change in the stopping time.

In this manner, with the charging system according to the fourth embodiment, when the passenger P waiting for the route bus 400 is detected at the bus stop, the advance preparation process is executed. Consequently, the crew of the route bus 400 does not need to operate the charge reservation operation button 402, thereby reducing the operation burden on the crew. Moreover, it is possible to prevent an operation error of the charge reservation operation button 402 by the crew, prevent the crew from forgetting to operate the charge reservation operation button 402, and the like. Furthermore, if none of the passengers is getting off at the bus stop, and the route bus 400 is going to pass through the bus stop, it is possible to prevent the advance preparation process from being unnecessarily executed.

In the second and the third embodiments, upon receiving the reservation information 404 from the route buses 1 and 400, the charger side controller 801 of the charging device 8 immediately executes the advance preparation process. However, it is not limited thereto, and the charger side controller 801 may start executing the advance preparation process at the time preceding expected times of arrival of the route bus 400 by the time required to perform the advance preparation process. In this manner, it is possible to complete the advance preparation process immediately before each of the route buses 400 arrives at the bus stop. Consequently, it is possible to prevent unnecessary operation from being performed by the charging device 8, while the route bus 400 is not stopping at the bus stop.

More specifically, the route bus 400 includes a time-keeping unit that keeps the current time, a storage unit that stores therein distance information indicating the distance between the bus stops that the route bus 400 stops, and an acquiring unit that acquires the position of the route bus 400 (for example, a global positioning system (GPS) receiver and the like). The charge controller 107 of the route bus 400 receives bus stop identification information capable of identifying the bus stop installed with the charging device 600, from the charging device 600 via the communication controller 109. Next, the charge controller 107 reads out distance information between the bus stop that the route bus 400 has last stopped and the bus stop that is identified by the received bus stop identification information, from the storage unit. Next, the charge controller 107 calculates the expected time of arrival that is the time the route bus 400 is expected to arrive at the next bus stop, on the basis of the read distance information, the position acquired by the acquiring unit, and the current time kept by the time-keeping unit. The charge controller 107 then transmits the reservation information 404 including the calculated expected time of arrival to the charging device 600 via the communication controller 109.

The charging device side communication unit 11 of the charging device 600 transmits the bus stop identification information of the bus stop installed with the charging device 600, to the route bus 400. Moreover, the charging device side communication unit 801 receives the reservation information 404 from the route bus 400. When the charging device side communication unit 11 receives the reservation information 404, the charger side controller 801 specifies the time preceding the expected time of arrival indicated in the received reservation information 404 by the time required to execute the advance preparation process, as the start time to start executing the advance preparation time. The charger side controller 801 then executes the advance preparation process from the specified start time.

When the charging device side communication unit 11 receives the reservation information 404 from the route buses 400, the charger side controller 801 specifies the time preceding the earliest expected time of arrival of the expected times of arrival in the reservation information received from the route buses 400 by the time required to execute the advance preparation process, as the start time. The charger side controller 801 then executes the advance preparation process from the specified start time. Consequently, when the order of arrival of the route buses 400 differs from the receiving order of the pieces of reservation information 404, it is possible to execute the advance preparation process according to the expected time of arrival of the route bus 400 that arrives earliest at the bus stop.

Fifth Embodiment

The present embodiment is an example of executing the advance preparation process when the destination of the passenger who is waiting for the route bus at the bus stop has registered in the charging device in advance is matched with the destination of the route bus stopping at the bus stop. In the following explanation, the descriptions of the same portions as those of the above embodiments are omitted.

In the present embodiment, the charging device side communication unit 11 of the charging device 8 receives destination information indicating the destination of the passenger using the route bus 400, from an external terminal such as a mobile phone and a smart phone, using a social network service (SNS) and the like. The charging device side communication unit 11 may also receive terminal position information indicating the position of an external terminal from the external terminal, with the destination information. The charger side controller 801 then sets the destination indicated in the received destination information, as the destination of the passenger who is waiting for the route bus 400 at the bus stop installed with the charging device 8.

When the destination indicated in the received destination information is matched with the destination of the route bus 400 that is the transmission source of the reservation information 404 received by the charging device side communication unit 11, the charger side controller 801 executes the advance preparation process according to the received reservation information 404. On the other hand, when the destination indicated in the received destination information is not matched with the destination of the route bus 400 that is the transmission source of the reservation information 404 received by the charging device side communication unit 11, the charger side controller 801 does not execute the advance preparation process. In this manner, when the destination of the passenger who is waiting for the route bus 400 at the bus stop differs from the destination of the route bus 400, the advance preparation process will not be executed. Thus, it is possible to prevent the advance preparation process to be performed prior to the arrival of the route bus 400 from being unnecessarily performed.

When the position indicated in the terminal position information received with the destination information does not match with the position of the bus stop installed with the charging device 8, the charger side controller 801 will not set the destination. In this manner, it is possible to prevent a situation that the passenger will not get on the route bus 400 that has arrived at the bus stop, even if the charging device 8 has executed the advance preparation process.

When a destination input button for entering the destination by the passenger waiting for the route bus 400 at the bus stop is provided on a guiding plate and the like at the bus stop, the charger side controller 801 may set the destination that is input using the destination input button, as the destination of the passenger who is waiting for the route bus 400 at the bus stop installed with the charging device 8. If the number of passengers who have set the destination does not match with the number of passengers detected by the detector 602, the charger side controller 801 may not set the destination.

In this manner, with the charging system according to the fifth embodiment, when the destination of the passenger who is waiting for the route bus 400 at the bus stop differs from the destination of the route bus 400, the advance preparation process will not be executed. Consequently, it is possible to prevent the advance preparation process to be performed prior to the arrival of the route bus 400 from being unnecessarily performed.

Moreover, the charger side controller 801 may give incentive such as providing route guide information, adding points, and giving a discount on the fare of the route bus 400 to the passenger who has set the destination.

Sixth Embodiment

The present embodiment is an example of executing the advance preparation process by using reservation information that the charging device has acquired from another charging devices installed at a bus stop prior to the bus stop installed with the charging device by one or more, and that the other charging device has received from the route bus. In the following explanation, the descriptions of the same portions as those of the above embodiments are omitted.

FIG. 7 is a diagram illustrating an example of a schematic configuration of a charging system according to a sixth embodiment. As illustrated in FIG. 7, in the present embodiment, a charging device side communication unit 701 of a charging device 700 wirelessly or wired communicate with the other charging device 600 that is installed at a bus stop prior to the bus stop installed with the charging device 700 by one or more, in addition to communicating with the route bus 400 that has stopped at the bus stop. More specifically, the charging device side communication unit 701 receives the reservation information 404 that the other charging device 600 has received from the route bus 400, from the other charging device 600. The charging device side controller 801 of the charging device 700 then executes the advance preparation process according to the reservation information 404 received from the other charging device 600.

In this manner, with the charging system according to the sixth embodiment, it is possible to acquire the reservation information 404 even if the charging device 700 cannot establish communication with the route bus 400 due to radio wave conditions, road conditions such as a tunnel, and the like. Consequently, it is possible to execute the advance preparation process according to the acquired reservation information 404.

Seventh Embodiment

The present embodiment is an example of displaying information for urging the crew to stop the route bus and transmitting the reservation information to the charging device, when the remaining charge level of the storage battery of the route bus becomes less than a predetermined amount. In the following explanation, the descriptions of the same portions as those of the above embodiments are omitted.

In the present embodiment, the charge controller 107 of the route bus 400 detects the battery voltage of the storage battery 4 via the battery information monitoring line 111. The charge controller 107 then detects the remaining charge level of the storage battery 4 on the basis of the detected battery voltage. In this example, the charge controller 107 determines whether the detected remaining charge level of the storage battery 4 becomes lower than a predetermined amount. In this example, the predetermined amount is the remaining charge level of the storage battery 4 set in advance, and for example, the lower limit of the remaining charge level that the storage battery 4 can be used, the power storage amount required to travel between the bus stops, and the like.

When the remaining charge level of the storage battery 4 becomes lower than a predetermined value, the charge controller 107 displays information for urging the crew to stop at the bus stop, on the bus stopping display 504. Moreover, the charge controller 107 transmits the reservation information 404 to the charging device 8 via the communication controller 109, regardless of whether a charging instruction signal for instructing the charging device 8 to start charging the storage battery 4 is input.

In this manner, with the charging system according to the seventh embodiment, when the remaining charge level of the storage battery 4 is lowered, the reservation information 404 is transmitted and the advance preparation process is executed even if there is no passenger on the route bus 400. Consequently, it is possible to reduce the burden on the crew, when the storage battery 4 is to be charged. Moreover, it is possible to prevent an operation error by the crew when the crew starts or stops charging the storage battery 4, or prevent the crew from forgetting to charge the storage battery 4.

When the expected time of arrival at the next bus stop is earlier than the passing time set in the operation schedule of the route bus 400 and the like, the charge controller 107 may display information for urging the crew to stop the route bus 400 and transmit the reservation information 404 to the charging device 8. In this manner, when the route bus 400 has plenty of time to pass through the bus stop, the reservation information 404 is transmitted and the advance preparation process is executed, even if there is no passenger on the route bus 400. Consequently, it is possible to reduce the burden on the crew, when the storage battery 4 is to be charged. Moreover, it is possible to prevent an operation error by the crew when the crew starts or stops charging the storage battery 4, or prevent the crew from forgetting to charge the storage battery 4.

More specifically, the route bus 400 includes the time-keeping unit that keeps the current time, and the storage unit that stores therein the operation schedule of the route bus 400, the traveling position of the route bus 400 (or bus stop identification information that can identify the bus stop the route bus 400 has last stopped), and distance information indicating the distance between the bus stops.

The charge controller 107 then calculates the expected time of arrival at which the route bus 400 arrives at the next bus stop, by using the current time kept by the time-keeping unit, and the traveling position of the route bus 400 (or the bus stop identification information) and the distance information that are stored in the storage unit. When the calculated expected time of arrival is earlier than the passing time of the next bus stop set by the operation schedule stored in the storage unit, the charge controller 107 displays information for urging the crew to stop at the bus stop, on the display, which is not illustrated. Moreover, the charge controller 107 transmits the reservation information 404 to the charging device 8 via the communication controller 109, regardless of whether a charging instruction signal for instructing the charging device 8 to start charging the storage battery 4 is input.

As described above, with the first to the seventh embodiments, the crew does not need to perform an operation of start or stop charging the storage battery 4 at the bus stop. Consequently, it is possible to reduce the operation burden on the crew.

Computer programs executed in the route buses 1, 400, and 500, and the charging devices 8, 600, and 700 of the present embodiment are provided by being incorporated in a read only memory (ROM) and the like in advance. The computer programs executed in the route buses 1, 400, and 500, and the charging devices 8, 600, and 700 of the present embodiment may also be provided by being recorded in a computer-readable recording medium such as a compact disc-read only memory (CD-ROM), a flexible disk (FD), a compact disc-recordable (CD-R), a digital versatile disc (DVD), and the like in an installable or executable file format.

Moreover, the computer programs executed in the route buses 1, 400, and 500, and the charging devices 8, 600, and 700 of the present embodiment may be provided by being stored in a computer connected to a network such as the Internet, and being downloaded via the network. The computer programs executed in the route buses 1, 400, and 500, and the charging devices 8, 600, and 700 of the present embodiment may also be provided or distributed via a network such as the Internet.

The computer programs executed in the route buses 1, 400, and 500, and the charging devices 8, 600, and 700 of the present embodiment have a modular configuration including the units described above (charge controller 107, communication controller 109, charge reservation unit 403, charger side controller 801, and detector 602). As actual hardware, the above units are loaded on a main storage device, and the charge controller 107, the communication controller 109, the charge reservation unit 403, the charger side controller 801, and the detector 602 are generated on the main storage device, when a central processing unit (CPU) reads out and executes the computer programs from the above ROM.

While some embodiments of the present invention have been described, these embodiments are merely examples, and are not intended to limit the scope of the invention. These novel embodiments may be implemented in various other forms, and various omissions, replacements, and modifications may be made without departing from the scope of the invention. These embodiments and the modifications are included in the scope or the spirit of the invention, and are included in the scope of the invention of claims and the equivalents thereof.

The invention claimed is:
1. An electric bus, comprising:
an electricity storage function unit;
a power receiving unit that receives electric power supplied from an external device by coming into contact with a power feeding unit of the external device;
a charger that charges the electricity storage function unit with the electric power received from the Power receiving unit;

a driving unit that drives the electric bus by receiving supply of the electric power from the electricity storage function unit;

one or more doors installed at an entrance and exit portion; and a controller that transmits a first signal to the external device upon detecting at least one of the doors is opened, the first signal including information capable of identifying an attribute of the electric bus and instructing the external device to start charging the electricity storage function unit, and that transmits a second signal to the external device upon detecting all the doors are closed, the second signal instructing the external device to stop charging the electricity storage function unit.

2. The electric bus according to claim 1, further comprising:

a switching unit that switches modes between a first mode and a second mode, the first mode being a mode in which charging the electricity storage function unit starts or stops according to a detection result of whether the door is opened or closed, the second mode being a mode in which charging the electricity storage function unit starts or stops according to an operation on a first button, and the controller transmits the first signal or the second signal to the external device according to the detection result of whether the door is opened or closed when the mode is switched to the first mode, and transmits the first signal or the second signal to the external device according to an operation on the first button when the mode is switched to the second mode.

3. The electric bus according to claim 1, wherein the first signal includes an identifier specific to the electric bus.

4. A charging system, comprising:

an electric bus; and a charging device that is provided at a first position and that supplies electric power to the electric bus, the first position is a position at which a passenger gets on and gets off the electric bus, the electric bus including:

an electricity storage function unit, a power receiving unit that receives the electric power supplied from the charging device by coming into contact with a power feeding unit of the charging device;

a charger that charges the electricity storage function unit with the electric power received from the power receiving unit;

a driving unit that receives supply of the electric power from the electricity storage function unit, and that drives the electric bus;

one or more doors installed at an entrance and exit portion; and a first controller that transmits a first signal to the charging device upon detecting at least one of the doors is opened, the first signal including identification information capable of identifying an attribute of the electric bus and instructing the charging device to start charging the electricity storage function unit; that transmits a second signal to the charging device upon detecting all the doors are closed, the second signal instructing the charging device to stop charging the electricity storage function unit; and that transmits a third signal to the charging device when information for instructing the charging device to make a reservation for charging the electricity storage function unit is input, the third signal including the identification information and instructing the charging device to execute a preparation process required for charging the electricity storage function unit, the charging device including:

a supplying unit that supplies the electric power to the electric bus by coming into contact with the power receiving unit, and a second controller that supplies the electric power to the electric bus by controlling the supplying unit, upon receiving the first signal from the electric bus; that stops supplying the electric power to the electric bus by controlling the supplying unit, upon receiving the second signal from the electric bus; and that executes the preparation process upon receiving the third signal.

5. The charging system according to claim 4, wherein the electric bus includes:

a display, and a bus stopping button, and the first controller causes the display to display information indicating that the bus stopping button is pressed, when the bus stopping button is pressed, and transmits the third signal to the charging device.

6. The charging system according to claim 4, wherein the charging device includes a detector configured to detect a person at the first position, and the second controller executes the preparation process, when the detector detects the person.

7. The charging system according to claim 6, wherein the second controller executes the preparation process when number of the person detected by the detector exceeds a predetermined value.

8. The charging system according to claim 4, wherein the first controller transmits the third signal including an expected time of arrival at the first position, to the charging device, and the second controller starts the preparation process at a time preceding an earliest time of a plurality of the expected times of arrival indicated in a plurality of the received third signals by a time required to perform the preparation process.

9. The charging system according to claim 4, wherein the second controller executes the preparation process when a destination registered in advance is matched with a destination of the electric bus that stops at the first position.

10. The charging system according to claim 4, wherein the second controller receives the third signal from another charging device that is installed at a bus stop prior to the first position by one or more, and executes the preparation process by using the received third signal.

11. The charging system according to claim 5, wherein the first controller detects remaining charge level of the electricity storage function unit, and causes the display to display information urging to stop at the first position and transmits the third signal to the charging device, when the detected remaining charge level becomes lower than a predetermined value.

12. The charging system according to claim 5, wherein the first controller causes the display to display information urging to stop at the first position and transmits the third signal to the charging device, when expected time of arrival at the first position is earlier than a passing time of the first position determined in an operation schedule.

* * * * *